(12) United States Patent
Troisi et al.

(10) Patent No.: US 10,753,786 B2
(45) Date of Patent: Aug. 25, 2020

(54) WEIGH-IN-MOTION SYSTEM AND METHOD WITH WEIGH TIME OPTIMIZATION

(71) Applicant: Mettler-Toledo, LLC, Columbus, OH (US)

(72) Inventors: David Troisi, Ithaca, NY (US); Patrick Toohey, Cortland, NY (US)

(73) Assignee: Mettler-Toledo, LLC, Columbus, OH (US)

( * ) Notice: Subject to any disclaimer, the term of this patent is extended or adjusted under 35 U.S.C. 154(b) by 168 days.

(21) Appl. No.: 16/014,717

(22) Filed: Jun. 21, 2018

(65) Prior Publication Data

US 2019/0391001 A1    Dec. 26, 2019

(51) Int. Cl.
    *G01G 11/04*    (2006.01)
(52) U.S. Cl.
    CPC .................. *G01G 11/046* (2013.01)
(58) Field of Classification Search
    CPC .................................................. G01G 11/046
    USPC .................................................. 177/1
    See application file for complete search history.

(56) References Cited

U.S. PATENT DOCUMENTS

| | | | | |
|---|---|---|---|---|
| 5,434,366 A * | 7/1995 | Troisi | ..................... | G01G 11/00 177/145 |
| 6,084,184 A * | 7/2000 | Troisi | ..................... | G01G 15/00 177/145 |
| 7,279,645 B1 * | 10/2007 | Inglin | ................... | G01G 11/046 177/145 |
| 7,405,368 B2 | 7/2008 | Beck et al. | | |
| 8,466,380 B2 * | 6/2013 | Inoue | ..................... | G01G 13/08 177/145 |
| 9,074,923 B2 | 7/2015 | Hyer et al. | | |
| 2010/0314177 A1 * | 12/2010 | Troisi | ..................... | G01G 11/003 177/52 |
| 2012/0285218 A1 * | 11/2012 | Inglin | ..................... | G01G 23/01 73/1.13 |
| 2018/0164146 A1 * | 6/2018 | Ragan | ................... | G01G 19/005 |

FOREIGN PATENT DOCUMENTS

| | | |
|---|---|---|
| EP | 2362194 A1 | 8/2011 |
| JP | 2-280017 A | 11/1990 |
| JP | 8-62025 A | 3/1996 |
| JP | 4017027 B2 | 12/2007 |
| JP | 2011-95216 A | 5/2011 |
| JP | 2011-203088 A | 10/2011 |
| JP | 2012-18056 A | 1/2012 |
| JP | 5036968 B2 | 9/2012 |

* cited by examiner

*Primary Examiner* — Jacques M Saint Surin
(74) *Attorney, Agent, or Firm* — Standley Law Group LLP; Jeffrey S. Standley; Eric M. Gayan

(57) ABSTRACT

Checkweigher system embodiments and associated weigh-in-motion methods that are usable to produce increased object weigh time and improved weight determination accuracy without a decrease in object throughput. Generally speaking, exemplary methods initiate weight data collection earlier than, and terminate weight data collection later than, known methods. An exemplary method may also make use of derived mean error data associated with object weight measurements at various locations along a checkweigher to determine if an object weight measured over less than a desired weigh time is nonetheless acceptable.

15 Claims, 4 Drawing Sheets

WEIGH-IN-MOTION SYSTEM AND METHOD WITH WEIGH TIME OPTIMIZATION

TECHNICAL FIELD

Exemplary embodiments described herein are directed to systems and methods for performing weigh-in-motion operations, wherein weigh time is optimized to allow for more accurate weight readings and decreased rejections.

BACKGROUND

The use of weigh-in-motion weighing devices to weigh moving objects should be quite familiar to one of skill in the art. Such weigh-in-motion devices are also commonly referred to as checkweighers. While various particular checkweigher designs exist, a typical in-line checkweigher (hereinafter just "checkweigher" for brevity) may be described generally as a weighing device designed to weigh objects as the objects travel—often at relatively high speed—along a conveyor. Consequently, a checkweigher is typically installed in a conveyor line between an infeed conveyor that delivers objects to the checkweigher and a discharge conveyor that transports weighed objects from the checkweigher to a downstream location.

Typically, checkweighers are used to determine whether objects being weighed are of an expected weight or within some acceptable range or zone around an expected weight. If the weight of an object is deemed acceptable by a checkweigher, the object is normally passed to a downstream location, where the object may be further processed, packaged, etc. If the weight of an object is deemed unacceptable by a checkweigher, the object may be rejected. An objective of such a checkweigher is not only to reject objects of improper weight, but also to minimize the occurrence of false rejections.

Very broadly speaking, a typical checkweigher of the aforementioned type includes a scale, which is essentially a vertically deflectable mechanism having a weigh platform and being operable to effect weighing of the moving objects through the use of load cells or other force detecting elements in combination with associated electronics, software, etc. Such a checkweigher also typically employs its own conveyor to transport objects received from the infeed conveyor across the scale and to the discharge conveyor.

The weight of a given object is normally determined through the continuous collection of weight data from the scale (i.e., the weigh-signal), which begins to accumulate when the weight of the object is fully supported by the scale and continues as the object moves across the scale. This weight data is then processed (e.g., filtered, averaged, etc.) to produce a single weight value that is associated with the object. While checkweighing has been known and used for some time, there are nonetheless deficiencies inherent to known checkweighing systems and methods that would be advantageous to overcome.

In order to provide accurate weight readings, it must be must ensured that only a single object to be weighed is in contact with the scale during the weighing data collection process. Similarly, because the weight of an object to be weighed must be fully supported by the scale, no portion of the object may be supported by the infeed or discharge conveyors during a weighing operation.

Any noise that is introduced into the collected weight data during the weighing process can also negatively affect the accuracy of object weight readings. One source of such noise is mechanical vibration of the scale that frequently occurs as an object transitions from the infeed conveyor onto the weigh platform of the checkweigher scale. Because such noise is reduced as the object settles, it is currently common practice to utilize a weigh platform that is longer than an object being weighed. The additional weigh platform length allows the object sufficient time to settle, resulting in object weight data with less inherent noise and improved accuracy.

It should be understood that optimal weighing is achieved when signal noise is minimized, and when weigh time is maximized to allow for greater weight data collection. Unfortunately, because modern processing operations place a premium on throughput, checkweigher users desire to minimize, not maximize, weigh time. As a result, weighing accuracy is often sacrificed for increased weighing speed.

Known checkweighers also utilize photo-sensors to determine when objects transition on and off the weigh platform. A weight data processing algorithm uses signals from these photo-sensors to determine which portions of the incoming weight data stream to analyze. Current weighing algorithms require that weight data processing be performed when the object being weighed reaches an evaluation point, i.e., a fixed position on the scale (e.g., 97% of the scale length). Once the object reaches the evaluation point it is assumed that noise is minimal and an acceptable amount of weight signal data has been collected. If a subsequent (upstream) object makes contact with the scale before the object being weighed reaches the evaluation point, known processing algorithms discard all collected weight signal data based on the assumption that the level of noise and amount of weight signal data is unacceptable for making an accurate object weight determination. This commonly leads to an object being unnecessarily rejected—not because the weight of the object is actually unacceptable, but because the weight of the object could not be adequately determined.

An upstream-located gapping belt conveyor may be used to pull gaps between incoming objects to assure a good read and sort prior to being put through label applicators or printers, barcode scanners, checkweighers and sorters by accelerating or decelerating of the gapping belt conveyor. The same situation of unnecessarily rejected objects could result if the clearance of the objects is too short due to a spacing fault established at the gapping belt conveyor.

SUMMARY

Exemplary checkweigher system embodiments and associated weigh-in-motion methods are designed to overcome the aforementioned deficiencies of known checkweighers. Exemplary checkweigher system embodiments and associated weigh-in-motion methods are usable to produce increased weigh time, which may result in object weight readings of improved accuracy without a decrease in object throughput.

In an exemplary embodiment, a checkweigher system may collect object weight data until the object being weighed reaches a variable object weighing evaluation point, as opposed to a set evaluation point (e.g., fixed distance) in the manner of known checkweighers.

In an exemplary embodiment, the transition point of an object to be weighed from an infeed conveyor to the scale of the checkweigher may be used as the trigger point for weight data collection, in which case the collection of weight data begins as soon as no portion of the object being weighed is being supported by the infeed conveyor, i.e. object weight data collection is initiated as soon as the object transitions from the infeed conveyor onto the checkweigher. Further, the trailing end of the object may overhang the upstream end of the checkweigher at the point of object weight data collection initiation.

In an exemplary embodiment, a fixed object weighing evaluation point that resides upstream of the point at which a given object will contact the discharge conveyor is established. Further, if another upstream object contacts the checkweigher prior to the object on the checkweigher reaching the fixed object weighing evaluation point, object weight data collection is terminated and an object weight reading is determined based on already collected data.

In an exemplary embodiment, the point at which the object being weighed transitions off of the scale of the checkweigher and onto a downstream structure (e.g., a discharge conveyor) may be used as the variable object weighing evaluation point, in which case the collection of weight data continues until the object being weighed is no longer fully supported by the scale.

In an exemplary embodiment, the point at which the object being weighed transitions off of the scale and onto a downstream structure (e.g., discharge conveyor), is used as the variable object weighing evaluation point.

In an exemplary embodiment, the object-contacting surface of the downstream structure may be set at a lower elevation than the object-contacting surface of the checkweigher so as to further increase object weigh time.

In an exemplary embodiment, the point at which an upstream object makes contact with the scale of the checkweigher may be used as the variable object weighing evaluation point for a downstream object being weighed by the checkweigher.

In an exemplary embodiment, weighing-data error introduced at various evaluation points may be characterized by the system, which can help determine an acceptable range within which the object weighing evaluation distance can vary.

In an exemplary embodiment, the characterization of weighing-data error is usable to assess the likely accuracy of the object weight as determined from weight data received prior to an object reaching a minimum object weighing evaluation point.

In an exemplary embodiment, a visual indication of expected weighing accuracy, e.g. that an expected error is visually indicated to a user, achieved at a series of evaluation points occurring prior and/or subsequent to a standard fixed object weighing evaluation point may be displayed or otherwise provided to a user.

One exemplary checkweighing method embodiment may include positioning a checkweigher between an infeed conveyor and a discharge conveyor, where the checkweigher includes a scale and a conveyor for transporting objects across the scale; conveying an object from the infeed conveyor onto the checkweigher; initiating object weight data collection at some point subsequent to the object being fully supported by the checkweigher; collecting object weight data until the object contacts the discharge conveyor; and using the collected object weight data to determine the weight of the object.

Another exemplary checkweighing method embodiment may include positioning a checkweigher between an infeed conveyor and a discharge conveyor, where the checkweigher includes a scale and a conveyor for transporting objects to be weighed across the scale; setting a conveying surface of the discharge conveyor at a lower elevation than a conveying surface of each of the infeed conveyor and the checkweigher conveyor; conveying an object from the infeed conveyor onto the checkweigher; initiating object weight data collection at some point subsequent to the object being fully supported by the checkweigher; collecting object weight data until the object contacts the discharge conveyor; and using the collected object weight data to determine the weight of the object.

Yet another exemplary method for determining the weight of in-motion objects using a checkweigher, where the checkweigher is positioned between an infeed conveyor and a discharge conveyor, and the checkweigher includes a scale and a conveyor for transporting objects to be weighed across the scale, may include establishing a weight data collection initiation point that coincides with the point at which an object to be weighed will transition from the infeed conveyor to the checkweigher; establishing a variable object weighing evaluation point that is downstream of the weight data collection initiation point, and coincides with the point at which the object to be weighed will contact the discharge conveyor; conveying an object from the infeed conveyor onto the checkweigher; initiating object weight data collection when the object reaches the weight data collection initiation point; collecting object weight data until the object reaches the variable object weighing evaluation point; and using the collected object weight data to determine the weight of the object.

Other aspects and features of the inventive concept will become apparent to those skilled in the art upon review of the following detailed description of exemplary embodiments along with the accompanying drawing figures.

BRIEF DESCRIPTION OF THE DRAWINGS

In the following descriptions of the drawings and exemplary embodiments, like reference numerals across the several views refer to identical or equivalent features, and.

DETAILED DESCRIPTION OF THE EXEMPLARY EMBODIMENTS

Figure 1:
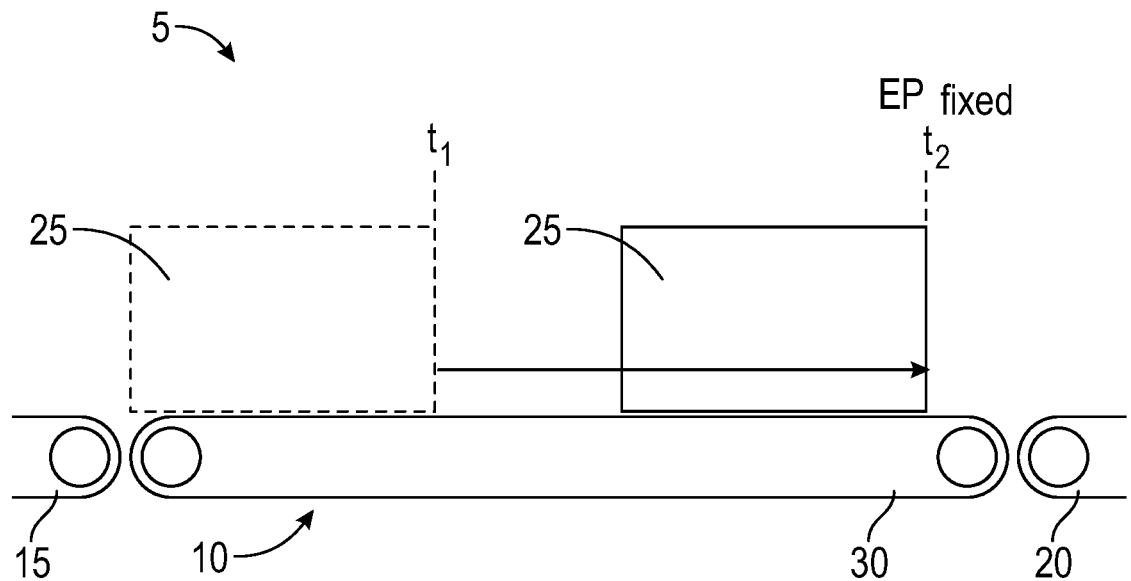
FIG. 1 schematically represents the general layout and weighing method associated with a known checkweigher.

A typical checkweigher system 5 and weigh-in-motion method is represented very generally in FIG. 1. As shown, the system 5 includes a checkweigher 10 that is interposed between an upstream infeed conveyor 15 and a downstream discharge conveyor 20. The infeed conveyor 15 supplies objects to be weighed 25 (hereinafter instead or also "objects" for brevity) to the checkweigher 10 from an upstream location. The discharge conveyor 20 transports weighed objects away from the checkweigher, such as to a downstream location for further processing, to a rejection bin, etc.

As shown, the checkweigher 10 also includes a conveyor 30 that moves objects to be weighed from the infeed conveyor 15, across the checkweigher 10, and to the discharge conveyor 20. Although the checkweigher 10 is shown in FIG. 1 (and the subsequent drawing figures) as consisting essentially of only a conveyor, it should be realized that this is simply a schematic representation, and one of skill in the art would understand that such a checkweigher will also typically include a scale. Checkweigher scales may be of various design, but generally speaking and without limitation, are commonly provided in the form of a vertically deflectable mechanism having a weigh platform and being operable to weigh the moving objects to be weighed through the use of load cells or other force detecting elements in combination with associated electronics, software, etc. Various sensors and other devices may be used to detect the position of an object to be weighed relative to the scale, etc.

Referring still to FIG. 1, it can be observed that the weighing process begins once an object to be weighed 25 has fully transitioned from the infeed conveyor 15 to the checkweigher 10 and is not overhanging the upstream end thereof (the position of the object represented in dashed lines). The leading edge of the object 25 lies at point $t_1$ at the onset of the weighing process and the corresponding collection of weight data by the checkweigher 10. The scale of the checkweigher 10 produces weight data as the object 25 moves across the checkweigher in the direction represented by the arrow. Due to the high speed at which some objects may be conveyed across the checkweigher, the time over which weight data is collected (i.e., the "weigh time") may be of very short duration.

In the known system 5 of FIG. 1, an object weight determination is made when the leading edge of the object 25 reaches a predetermined and fixed object weighing evaluation point $t_2$. This fixed object weighing evaluation point $t_2$ is placed at a location along the checkweigher 10 where it can be ensured that any movement of the object to be weighed 25 has settled, and the entirety of the object will be supported by only the checkweigher and not partially by the discharge conveyor 20. Because of the potential speed at which an object to be weighed may be conveyed across the checkweigher 10, the fixed object weighing evaluation point $t_2$ is typically located at some distance upstream of the downstream end of the checkweigher (e.g., 3% of the checkweigher length) to provide a factor of safety for the weight determination.

While a checkweighing system 5 and associated weigh-in-motion method as represented in FIG. 1 is known and in use, such a configuration reduces the length of the checkweigher over which weight data can be collected and, correspondingly, reduces the overall weigh time. Since weighing accuracy improves with increased weight time, it should be apparent that such a configuration and method is disadvantageous.

Exemplary checkweighing system embodiments and associated weigh-in-motion methods are designed to overcome this disadvantage. A generalized exemplary system 50 embodiment and associated weigh-in-motion method are schematically represented in FIG. 2.

Figure 2:
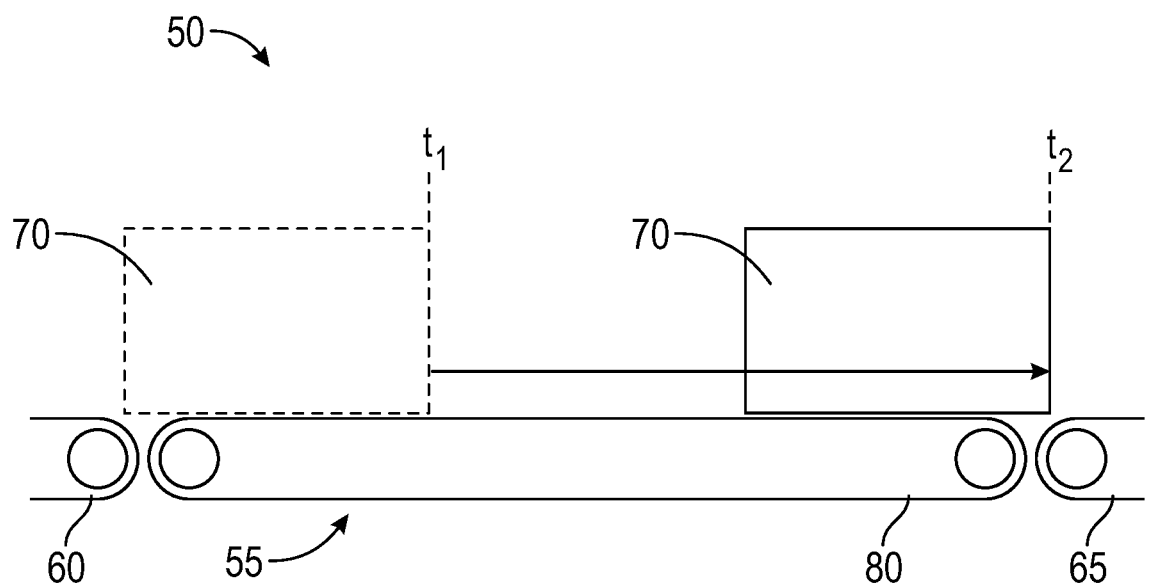
FIG. 2 schematically represents the general concept of one exemplary checkweighing system and weighing method according to the inventive concept, whereby the weighing time associated with an object is extended without reducing throughput.

As shown, the exemplary checkweighing system 50 of FIG. 2 similarly includes a checkweigher 55 that is interposed between an upstream infeed conveyor 60 and a downstream discharge conveyor 65. The infeed conveyor 60 again supplies objects to be weighed 70 to the checkweigher 55 from an upstream location. The discharge conveyor 65 again transports weighed objects away from the checkweigher. Both the checkweigher 55 and the objects to be weighed 70 in FIG. 2 are of the same dimension as the checkweigher 10 and objects to be weighed 25 in FIG. 1 for purposes of comparison.

Although the checkweigher 55 is again shown as consisting essentially of only a conveyor 80, it should again be realized that such a checkweigher will also typically include a scale of the type described generally above, or of any other design known in the art. It is to be understood that exemplary checkweighing system and method embodiments according to the inventive concept are not limited to any particular scale design.

The difference between the exemplary system and weigh-in-motion method represented in FIG. 2 and the known system and weigh-in-motion method represented in FIG. 1 is readily apparent. As represented in FIG. 2, the process of weighing an object 70 according to this exemplary embodiment begins as soon as the object has transitioned sufficiently far onto the checkweigher 55 so that no portion thereof is still in contact with the infeed conveyor 60. Thus, the weighing process may begin before the trailing edge of the object to be weighed 70 reaches the upstream side of the checkweigher 55 (i.e., while the upstream end of the object overhangs the upstream end of the checkweigher), and while the leading edge of the object to be weighed lies at a point $t_1$ that is upstream of point $t_1$ according to the known system and weigh-in-motion method represented in FIG. 1. In other words, the weighing process according to the exemplary weighing method represented in FIG. 2 begins earlier than the weighing process according to the known weighing method represented in FIG. 1.

The scale of the checkweigher 55 again produces and reports weight data as the object 70 moves across the checkweigher in the direction represented by the arrow. In the exemplary embodiment 50 of FIG. 2, weight data is collected while the object 70 is in motion and is used to make an object weight determination when the leading edge of the object 70 reaches a downstream object weighing evaluation point, which is again designated as $t_2$ for purposes of comparison. Unlike the known system 5 and associated weigh-in-motion method represented in FIG. 1, however, the object weighing evaluation point $t_2$ associated with the exemplary embodiment 50 of FIG. 2 is variable rather than fixed. Particularly, the point $t_2$ that is used to signal the end of weight data collection and trigger an object weight determination in the exemplary embodiment 50 of FIG. 2, is the point immediately before or at which the leading edge of the object to be weighed 70 contacts the upstream end of the discharge conveyor 65. Thus, in comparison to the known weigh-in-motion method represented in FIG. 1, the exemplary weigh-in-motion method represented in FIG. 2 allows for weight data to be collected until the object to be weighed 70 is farther downstream on the checkweigher 55.

Figure 3:
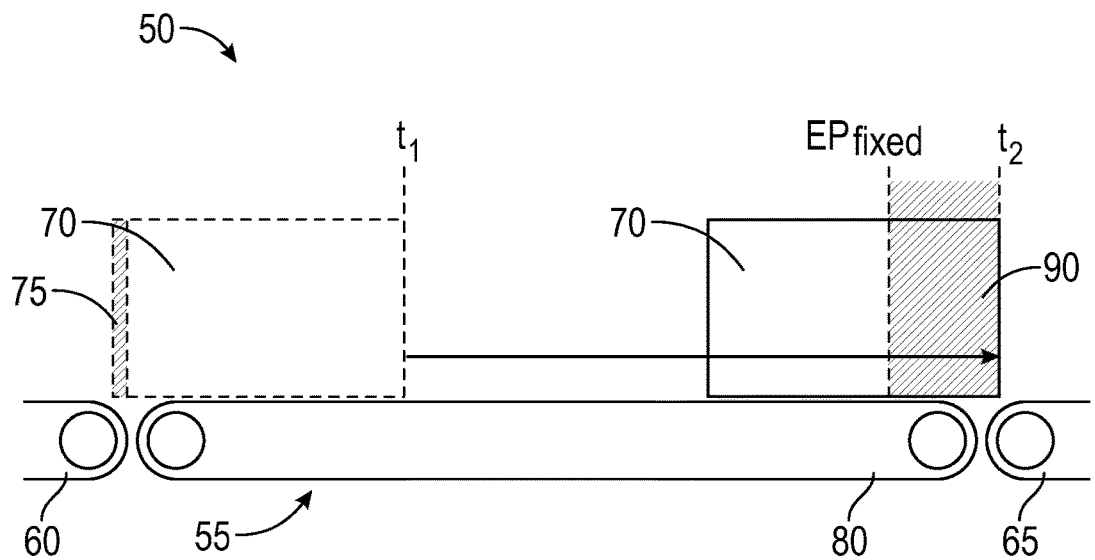
FIG. 3 shows the exemplary checkweighing system and demonstrates the increased weighing time in comparison to the weighing time associated with a known checkweighing system and weighing method such as represented in FIG. 1.

The increase in object settling time and weight data collection time afforded by the exemplary weigh-in-motion method represented in FIG. 2 is revealed even more clearly in FIG. 3. FIG. 3 depicts the same checkweighing system 50 of FIG. 2, with the same object to be weighed 70 and points $t_1$ and $t_2$ all shown in the same positions. FIG. 3, however, includes a first hatched area that represents a first expanded weight data collection zone 75 resulting from initiation of the weighing process at a point $t_1$ that is located upstream of the point $t_1$ of the known weigh-in-motion method represented in FIG. 1. Likewise, FIG. 3 also includes a second hatched area that represents a second expanded weight data collection zone 90 resulting from continuation of the weighing process until the object 70 reaches a variable object weighing evaluation point $t_2$ that is located downstream of the fixed object weighing evaluation point EP—fixed of the known weigh-in-motion method represented in FIG. 1. The aggregate of the linear distance along the travel path of the object 70 (as indicated by the arrow) associated with each of the first and second expanded weight data collection zones 75, 90 constitutes the additional distance over which weight data may be collected and represents the resulting increase in object weigh time afforded by the exemplary weigh-in-motion method represented in FIGS. 2-3.

As explained above, optimal weighing of an in-motion object is achieved when signal noise is minimized, and when weigh time is maximized to allow for greater weight data collection. It should be apparent from FIGS. 2-3 that exemplary system and weigh-in-motion method embodiments of the inventive concept afford the additional settling time and weigh time that is required for optimized, accurate object weight readings. Furthermore, because said exemplary embodiments provide for such additional settling time and weigh time without a corresponding increase in checkweigher length or a decrease in conveyor speed, there is no reduction in throughput.

Figure 4:
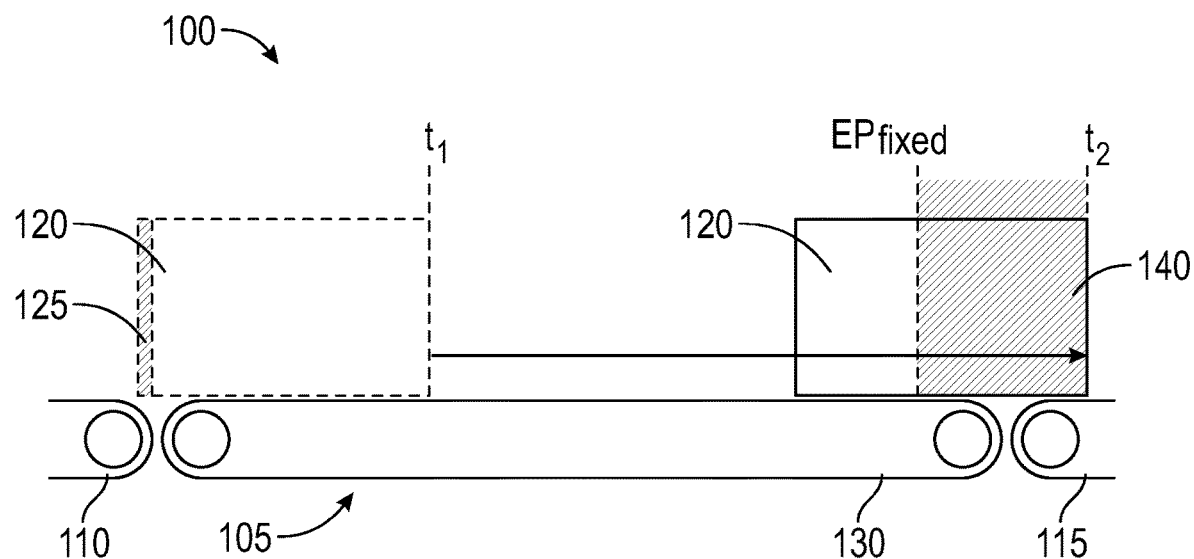
FIG. 4 schematically represents another exemplary checkweighing system and weighing method according to the inventive concept, whereby the weighing time associated with an object is even further extended without reducing throughput.

Another exemplary embodiment of a checkweighing system 100 and associated weigh-in-motion method according to the inventive concept is represented in FIG. 4. As with the system 50 shown in FIGS. 2-3, this exemplary system 100 includes a checkweigher 105 that is interposed between an upstream infeed conveyor 110 and a downstream discharge conveyor 115. The infeed conveyor 110 again supplies objects to be weighed 120 to the checkweigher 105 from an upstream location. The discharge conveyor 115 again transports weighed objects away from the checkweigher 105. Although the checkweigher 105 is again shown as consisting essentially of only a conveyor 130, it should again be realized that such a checkweigher will also typically include a scale of the type described generally above, or of any other design known in the art.

The exemplary checkweighing system 100 and associated weigh-in-motion method represented in FIG. 4 is very similar to the system 50 and associated weigh-in-motion method represented in FIGS. 2-3. In FIG. 4, however, it can be seen that the height of the discharge conveyor 115 has been reduced such that the object-contacting surface thereof resides at a lower elevation than the object-contacting surface of the checkweigher 105. Consequently, the object to be weighed 120 is able to travel farther downstream on the checkweigher 105 before it will finally tip and contact the discharge conveyor 115.

The benefit of the checkweighing system 100 design depicted in FIG. 4 is an even further possible increase in weigh time afforded by the additional distance over which weight data may be collected. The further increase in possible weigh time over the exemplary embodiment of FIGS. 2-3 is characterized by the hatched area of FIG. 4, which again represents a second expanded weight data collection zone 140 resulting from continuation of the weighing process until the object 120 reaches a variable object weighing evaluation point $t_2$ that is the point at which the object will transition to the discharge conveyor 115 and is located downstream of the fixed object weighing evaluation point EP—fixed of the known weigh-in-motion method represented in FIG. 1. The aggregate of the linear distance along the travel path of the object 120 (as indicated by the arrow) associated with each of the first and second expanded weight data collection zones 125, 140 constitutes the additional distance over which weight data may be collected and represents the increase in weigh time afforded by this exemplary weigh-in-motion method.

It may be observed in FIG. 4 that the linear distance along the travel path of the object 120 associated with the second expanded weight data collection zone 140 of this embodiment is greater than the linear distance along the travel path of the object 70 associated with the second expanded weight data collection zone 90 of the exemplary embodiment of FIGS. 2-3. Therefore, in comparison to the exemplary embodiment of FIGS. 2-3, the exemplary weigh-in-motion method represented in FIG. 4 provides for an even further increase in weigh time, and may resultantly provide for a corresponding improvement in object weight reading optimization and accuracy.

While the exemplary weigh-in-motion methods represented in FIGS. 2-3 and FIG. 4 all include starting the process of collecting object weight data at a point substantially immediately after the object has transitioned onto the checkweigher and is still overhanging the upstream end thereof, in conjunction with collecting object weight data until the object transitions onto the discharge conveyor, such does not have to be the case. For example, an exemplary weigh-in-motion method according to the inventive concept may collect object weight data until the object to be weighed transitions onto the discharge conveyor, but may delay the commencement of object weight data collection until the object reaches a position on the checkweigher that is more typical of a known weigh-in-motion method (see, e.g., FIG. 1).

Figure 5:
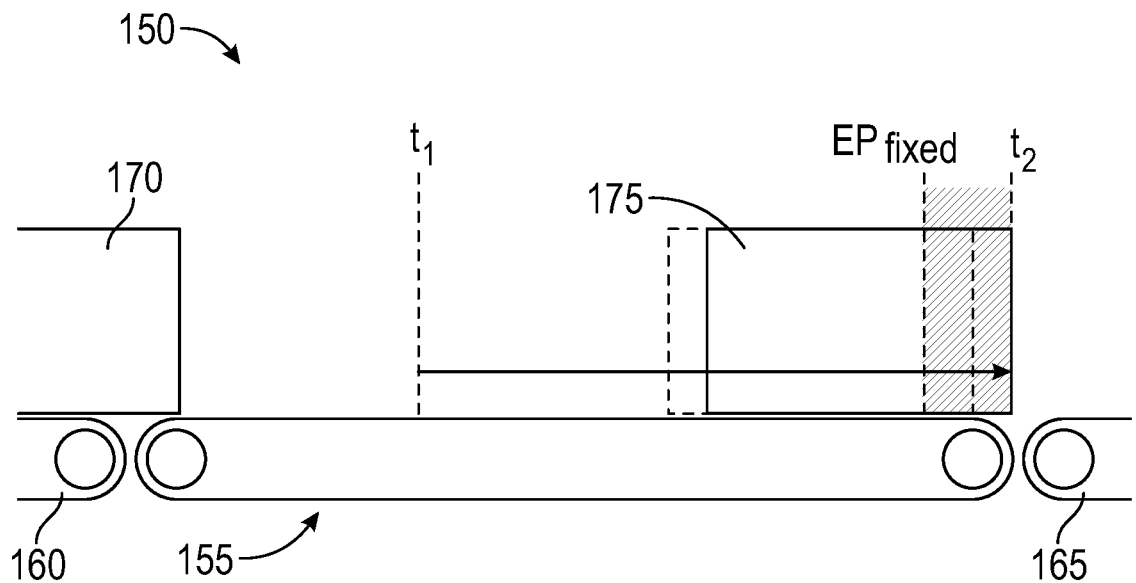
FIG. 5 schematically represents a situation where an upstream object makes contact with the scale of the checkweigher system of FIG. 2 or FIG. 3 before the object being weighed begins to transition off of the checkweigher.
Figure 6:
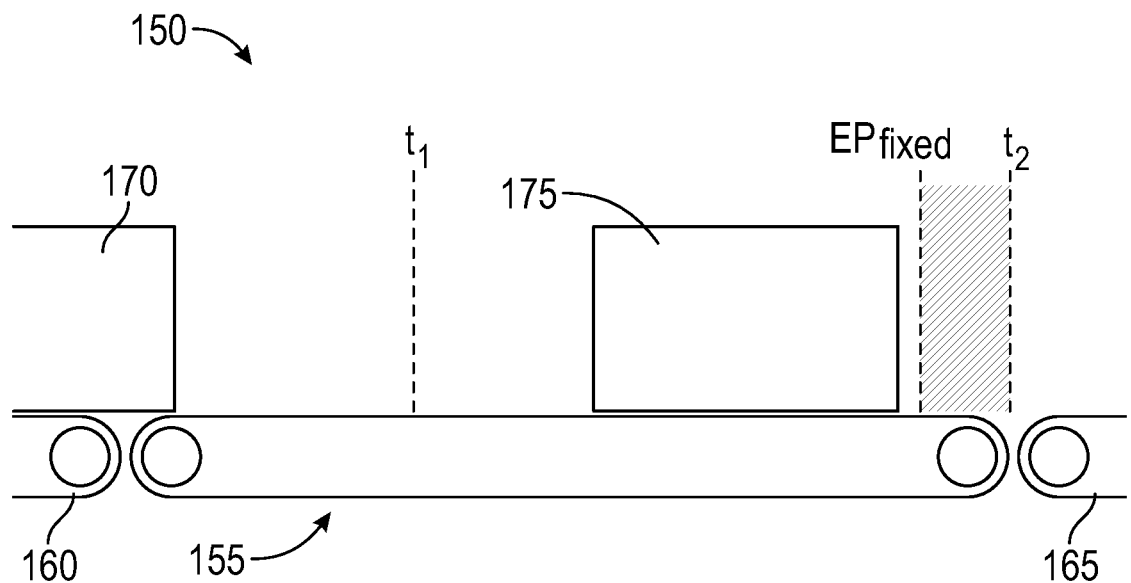
FIG. 6 schematically represents a situation where an upstream object makes contact with the scale of an exemplary checkweigher system according to the general inventive concept before the object being weighed reaches a standard fixed object weighing evaluation point.

FIGS. 5-6 are provided to represent a scenario where there is contact between an upstream object and a checkweigher during an object weighing operation. FIGS. 4-5 again depict an exemplary checkweighing system 150 and associated weigh-in-motion method, such as that represented in FIGS. 2-3. The checkweighing system 150 once again includes a checkweigher 155 that is interposed between an upstream infeed conveyor 160 and a downstream discharge conveyor 165. The infeed conveyor 160 again supplies objects to be weighed 170 to the checkweigher 155 from an upstream location. The discharge conveyor 165 again transports weighed objects away from the checkweigher. Although not shown, it should again be realized that such a checkweigher will also typically include a scale of the type described generally above, or of any other design known in the art.

The situation represented in FIG. 5 is one in which an upstream object 170 makes contact with the scale of the exemplary checkweigher 155 at a point where an object being weighed 175 has not yet transitioned off the scale of the checkweigher, but after a leading edge of the object has already crossed a fixed object weighing evaluation point $EP_{fixed}$. In comparison, FIG. 6 represents a situation in which an upstream object 170 makes contact with the scale of the exemplary checkweigher 155 prior to the time that a leading edge of an object being weighed 175 reaches the fixed object weighing evaluation point $EP_{fixed}$.

In FIG. 5, the point $t_2$ represents the point at which weight data collection relative to the object being weighed 175 is terminated and becomes the point at which the weight of the object 175 is determined. The point $t_2$ coincides with the location of the leading edge of the object being weighed 175 at the time the upstream object 170 contacts the scale of the checkweigher 155 and, thus, any weight data subsequently collected relative to the object being weighed 175 would be inaccurate.

While the situation represented in FIG. 5 results in less weigh time than the amount of weigh time associated with the weigh-in-motion methods represented in FIGS. 2-3 or FIG. 4, using a variable object weighing evaluation point $t_2$ as shown in FIG. 5 and as described with respect to FIGS. 2-3 and FIG. 4 nonetheless provides for greater weigh time than would be afforded if using a fixed object weighing evaluation point $EP_{fixed}$ according to known weigh-in-motion methods. Thus, even when the object weighing process is interrupted as represented in FIG. 5, an exemplary weigh-in-motion method according to the inventive concept will still result in a usable object weight reading, whereas the use of a known weigh-in-motion method in a like situation may result in no object weight reading or an inaccurate object weight reading.

The situation represented in FIG. 6 differs from that of FIG. 5 in that in FIG. 6, an upstream object 170 makes contact with the scale of the exemplary checkweigher 155 at a point prior to the leading edge of an object being weighed 175 reaching the fixed object weighing evaluation point $EP_{fixed}$. According to known weigh-in-motion methods, this situation would almost certainly result in no object weight reading or a very inaccurate object weight reading. Consequently, the object being weighed would most likely be rejected even though its weight may very well be completely acceptable.

Exemplary weigh-in-motion methods according to the inventive concept may be usable to overcome the likely, and very possibly unnecessary, rejection of the object being weighed 175 by a known weigh-in-motion method in response to the scenario represented in FIG. 6. Particularly, an exemplary weigh-in-motion method according to the inventive concept may be capable of determining whether an object weight reading generated using weigh data collected prior to the object being weighed reaching even the fixed object weighing evaluation point $EP_{fixed}$, is nonetheless sufficiently accurate to render the object weight reading satisfactory for object weight zone classification and associated acceptance or rejection decisions.

Figure 7:
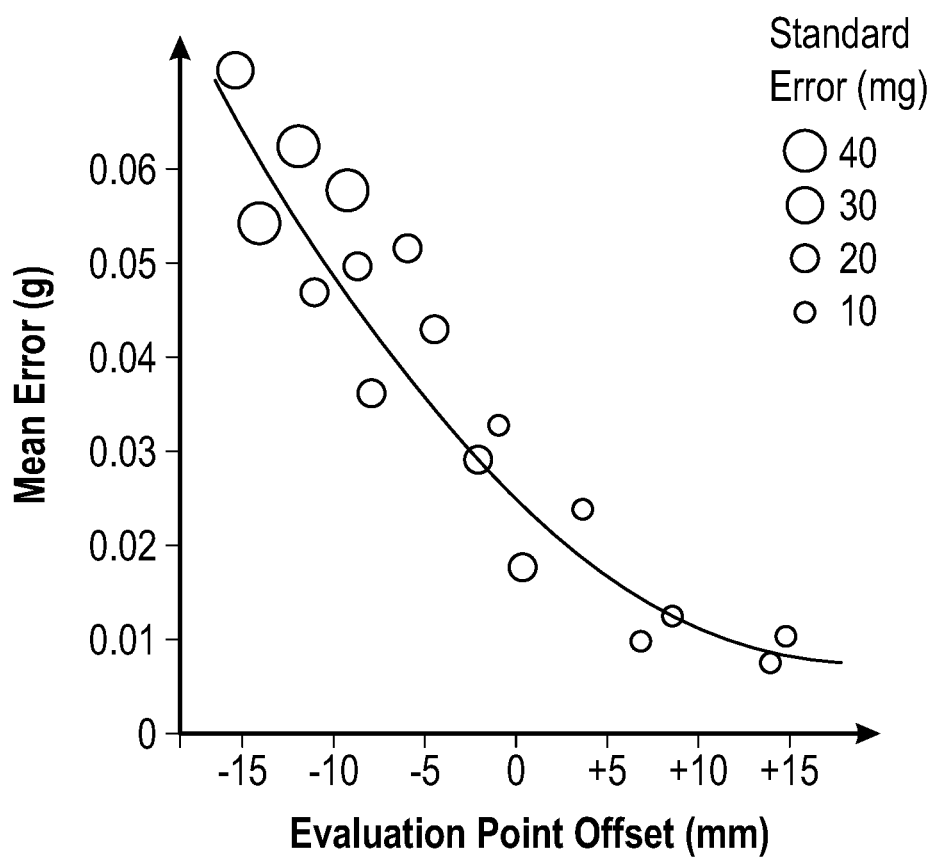
FIG. 7 graphically represents an exemplary visual indication of expected weighing accuracy achieved at a series of evaluation points occurring prior and/or subsequent to a standard fixed object weighing evaluation point, according to one exemplary checkweighing method of the general inventive concept.

The aforementioned functionality of an exemplary weigh-in-motion method according to the inventive concept may be better understood by further reference to FIG. 7. The graph of FIG. 7 depicts the mean error associated with object weight determinations made when the weighed object is located at various points on the checkweigher that are offset from the fixed object weighing evaluation point $EP_{fixed}$. As expected, the mean error increases with upstream distance of the object from the fixed object weighing evaluation point $EP_{fixed}$, and decreases as the object closes in on and passes the fixed object weighing evaluation point $EP_{fixed}$. Such mean error determinations may, for example, be made through manual experimentation, and the resulting data may be stored in a manner that is accessible by a given checkweigher.

In practice then, when a scenario like that represented in FIG. 6 arises, an exemplary weigh-in-motion method may include detecting the distance of the leading edge (or some other datum) of the object being weighed from the fixed object weighing evaluation point $EP_{fixed}$ at the time an upstream object contacts the scale of the checkweigher, and accessing the stored data to determine the mean error in the object weight reading that can be expected at that distance.

A standard checkweighing process typically includes: (a) determining the object weight, (b) classifying the object into a zone based on its measured weight, and (c) performing any actions associated with the zone (e.g., acceptance, rejection). The graph of FIG. 7 suggests that there is always some level of error in the weighing process. Therefore, if it can be demonstrated that the zone classification of a given object would not change if the measured weight was offset by the maximum likely error—established by way of the aforesaid experimentation and resulting data—then it would not be necessary to reject the object based simply on the less than desired weigh time. For example, if it is determined that the accuracy of an object whose weight was determined using weight data collected at a point 10 mm upstream of the fixed object weighing evaluation point is +/−2 grams, then the object could be considered as acceptable as long as the measured object weight is not within 4 grams of a reject-zone boundary. The level of uncertainty with respect to the actual weight is known and the resulting classification would not change even if the worst case error was present.

It can be understood from the foregoing description that when a spacing fault occurs, i.e. an upstream item makes contact with the scale of the checkweigher before an object being weighed reaches a minimum predetermined evaluation point, as shown in FIG. 6, then the previously collected weight data for the object being weighed may still be used to calculate an object weight according to an exemplary weigh-in-motion method. In such a case, the classification of the weighed object may include not only the measured weight, but also an indication of the level of accuracy expected based on the distance from the minimum predetermined evaluation point at which the object weight calculation was made. In the known weigh-in-motion method, the spacing fault demonstrated in FIG. 6 requires the rejection of both the object being weighed 175 and the encroaching upstream object 170 as the weigh signal for each object contains data influenced by the other. This signal contamination cannot be reconciled by the known weigh-in-motion method. Use of an exemplary weigh-in-motion method may thus result in a reduction of the number of items rejected due to object spacing faults.

In some exemplary embodiments, a visual indication of expected weighing accuracy achieved at a series of evaluation points occurring prior and/or subsequent to a standard fixed object weighing evaluation point may be displayed or otherwise provided to a user. Such a visual indication may take the form of a graph, such as for example the graph of FIG. 7, or some other form. A visual indication in graph or plot form may include data from multiple sample objects of differing weights. Filters may be used to highlight or hide a subset of all data to simplify comparisons. When a visual indication is provided, it may be presented for example, on a control user-interface associated with a checkweigher.

Exemplary system and weigh-in-motion methods may employ various sensors and/or other devices to detect and report the position of an object to be weighed relative to the scale, etc. For example, sensors may be used to determine when an object to be weighed transitions from an infeed conveyor to the scale of a checkweigher and/or to determine when an object to be weighed transitions from a scale of a checkweigher to a discharge conveyor. Sensors may also be used to determine the position of an object relative to a fixed object weighing evaluation point for purposes of evaluating the expected mean error of an object weight reading, or otherwise. The sensors employed in a given exemplary embodiment may be a part of, associated with or completely separate from the checkweigher. The sensors may be load cells of the checkweigher. Exemplary sensors may also be without limitation, photodetectors, proximity sensors, other force/load sensors, and combinations thereof. Nothing herein is to be construed as limiting the exemplary embodiments to the use of any particular type, number or location of sensors, nor to absolutely requiring the use of sensors beyond those used to measure the weight of objects crossing the checkweigher.

While certain embodiments of the inventive concept have been described in detail above, the scope of the inventive concept is not considered limited by such disclosure, and modifications are possible without departing from the spirit of the inventive concept as evidenced by the following claims:

What is claimed is:

1. A method for determining the weight of in-motion objects, the method comprising:
    positioning a checkweigher between an infeed conveyor and a discharge conveyor, the checkweigher including a scale and a conveyor for transporting objects across the scale;
    establishing a fixed object weighing evaluation point that resides upstream of the point at which a given object will contact the discharge conveyor;
    conveying an object from the infeed conveyor onto the checkweigher;
    initiating object weight data collection at some point subsequent to the object being fully supported by the checkweigher;
    collecting object weight data until the object contacts the discharge conveyor; and
    using the collected object weight data to determine the weight of the object;
    wherein if another upstream object contacts the checkweigher prior to the object on the checkweigher reaching the fixed object weighing evaluation point, object weight data collection is terminated and an object weight reading is determined based on already collected data.

2. The method of claim 1, wherein the object weight data collection is initiated as soon as the object transitions from the infeed conveyor onto the checkweigher.

3. The method of claim 2, wherein a trailing end of the object overhangs the upstream end of the checkweigher at the point of object weight data collection initiation.

4. The method of claim 1, further comprising providing the checkweigher with experimentally derived mean error data associated with object weight determinations made when an object is located on the checkweigher at various upstream distances from the fixed object weighing evaluation point.

5. The method of claim 4, wherein the checkweigher is programmed to analyze the mean error data to determine if the expected error associated with an object weight determination made at the given position of the object on the checkweigher is sufficiently small to accept the object weight determination.

6. The method of claim 5, wherein the expected error is visually indicated to a user.

7. The method of claim 1, wherein a conveying surface of the discharge conveyor is set at a lower elevation than a conveying surface of each of the infeed conveyor and the checkweigher conveyor.

8. A method for determining the weight of in-motion objects using a checkweigher, the checkweigher positioned between an infeed conveyor and a discharge conveyor, the checkweigher including a scale and a conveyor for transporting objects to be weighed across the scale, the method comprising:
    establishing a weight data collection initiation point that coincides with the point at which an object to be weighed will transition from the infeed conveyor to the checkweigher;
    establishing a variable object weighing evaluation point that is downstream of the weight data collection initiation point, and coincides with the point at which the object to be weighed will contact the discharge conveyor;
    conveying an object from the infeed conveyor onto the checkweigher;
    initiating object weight data collection when the object reaches the weight data collection initiation point;
    collecting object weight data until the object reaches the variable object weighing evaluation point; and
    using the collected object weight data to determine the weight of the object.

9. The method of claim 8, wherein a trailing end of the object overhangs the upstream end of the checkweigher at the weight data collection initiation point, and a leading end of the object overhangs the downstream end of the checkweigher at the variable object weighing evaluation point.

10. The method of claim 8, further comprising establishing a fixed object weighing evaluation point that resides upstream of the variable object weighing evaluation point.

11. The method of claim 10, wherein if another upstream object contacts the checkweigher prior to the object on the checkweigher reaching the fixed object weighing evaluation point, object weight data collection is terminated and an object weight reading is determined based on already collected data.

12. The method of claim 11, further comprising providing the checkweigher with experimentally derived mean error data associated with object weight determinations made when an object is located on the checkweigher at various upstream distances from the fixed object weighing evaluation point.

13. The method of claim 12, wherein the checkweigher is programmed to analyze the mean error data to determine if the expected error associated with an object weight determination made at the given position of the object on the checkweigher is sufficiently small to accept the object weight determination.

14. The method of claim 13, wherein the expected error is visually indicated to a user.

15. The method of claim 8, wherein a conveying surface of the discharge conveyor is set at a lower elevation than a conveying surface of each of the infeed conveyor and the checkweigher conveyor.

* * * * *

UNITED STATES PATENT AND TRADEMARK OFFICE
CERTIFICATE OF CORRECTION

PATENT NO. : 10,753,786 B2  
APPLICATION NO. : 16/014717  
DATED : August 25, 2020  
INVENTOR(S) : Troisi et al.

Page 1 of 1

It is certified that error appears in the above-identified patent and that said Letters Patent is hereby corrected as shown below:

In the Specification

In Column 7, Line 18, please delete "EP--fixed" and insert -- $EP_{fixed}$ --.

In Column 8, Line 10, please delete "EP--fixed" and insert -- $EP_{fixed}$ --.

Signed and Sealed this  
Twentieth Day of October, 2020

Andrei Iancu  
*Director of the United States Patent and Trademark Office*